Patented July 13, 1937

2,086,828

UNITED STATES PATENT OFFICE 2,086,828

CERAMIC COMPOSITION

Johan Bertil Stålhane, Stockholm, Sweden

No Drawing. Application March 18, 1936, Serial No. 69,604. In Sweden April 9, 1935

8 Claims. (Cl. 106—10)

The present invention relates to a new bonding agent for ceramic compositions respectively containing substances which on slight heating form arsenates of aluminium or iron, viz. on the one hand substances, such as clay (kaolin), bauxite or other aluminium hydroxides, containing a high percentage of aluminium oxide (Al$_2$O$_3$) and on the other hand substances containing arsenic compounds, such as arsenic acid or acid-reacting arsenates of the alkaline earth metals or ammonium arsenate respectively. The invention also relates to objects manufactured from such a ceramic composition.

The invention is based on the results of extensive laboratory researches. As found by said researches there is formed upon drying or slight heating of a moist ceramic product containing substances of the above mentioned kind, aluminium arsenates or iron arsenates respectively which are chemically indifferent and by which the mass will obtain a considerable strength.

With the substances which are rich in aluminium oxide the arsenic acid reacts only insignificantly in a moist mixture at ordinary temperature. Already at about 100° C. the formation of arsenate starts, however, and at 200 to 300° C. the acid is completely bound to the basic substances. If the aluminium oxide is present in the form of clay (kaolin, aluminium silicate hydrate) the reaction takes place under formation of free silicic acid.

When acid-reacting arsenates are used, for example monocalcium orthoarsenate (acid-reacting calcium arsenate), the free acid necessary for binding the mass is not formed until after the addition of water, the arsenic acid bound in the arsenate being then partly set free through hydrolysis and thereafter reacting with the other substances upon slight heating. At the same time a chemically indifferent arsenate is formed.

A product according to the invention is preferably used as a binding agent in mixture with filling materials such as quartz, chamotte, synthetic spinel, sillimanite, sintered corundum, et cetera. As an example can be mentioned a product consisting of 75 to 95% filling material, 24.5 to 4.5% clay (kaolin), bauxite or other aluminium hydroxides, and 0.5 to 5% arsenic compounds.

In the application of the invention for manufacturing a highly refractory product or bodies shaped from such a product, or in the employment for electroheating purposes in combination with certain aluminium-holding resistance alloys which are particularly sensitive to corrosion by the ceramic material, the mixture should be so composed that it will consist of as pure aluminium oxide as possible. Preferably pure bauxite or other aluminium oxide hydrates with sintered corundum or some other pure crystalline form of aluminium oxide are used as filling material. As an example may be mentioned a mass consisting of 80 to 95% sintered corundum or the like, 19.5 to 4.5% aluminium hydroxide (bauxite), and 0.5 to 2% arsenic acid.

In some cases it may be advantageous to supply the arsenic acid entirely or partly in the form of ammonium arsenate which when heated is decomposed while giving off ammonia and setting free acid and which, as shown by experiments, will then react with components rich in alumina while forming arsenates of aluminium. The advantage is hereby gained that the arsenic acid may be supplied, as in using acid-reacting salts of alkaline earth metals, to the ceramic mixture in the form of compounds and in the state of a dry powder, whereby on the one hand the addition of alkaline earths, which in many cases are injurious from a ceramic point of view, is avoided, and on the other hand, the acid is better utilized for binding purposes than in the case of salts of alkaline earth metals, in which case a great part of the acid remains bound to the alkaline earths even after the reaction.

On account of its lower percentage of ammonia the monoarsenate (H$_4$NH$_2$AsO$_4$) is preferably used in the application of the invention, although the corresponding diammonium salts and triammonium salts also may be used.

In order to improve the binding effect it has been found in certain cases to be advantageous to add to the main substances of the ceramic mass, in addition to the ammonium salt in question, aluminium in the form of water soluble salts, for example aluminium sulphate or chloride. Through a double decomposition there are then formed aluminium arsenate and ammonium salts, for example ammonium sulphate or chloride, which are already vaporized upon a slight heating, less than 500° C. In this case the ammonium arsenate together with a water soluble aluminium salt can be regarded as a binding agent for the ceramic mass. The advantages of this particular application of the invention is that the binding aluminium arsenate is obtained in an extremely finely divided form.

The mass is intended to be used for various ceramic purposes such as form bricks, rammed masses, refractory mortar, embedding mass for resistance wires in electric heating apparatus and for the manufacture of articles of various shapes, a heating of the shaped moist material to 200 to 300° C. being sufficient to give the material a good strength.

I claim:—

1. A bonding agent for refractories, consisting of a mixture of substances containing a high percentage of aluminium oxide ($Al_2O_3$) with arsenic compounds having the quality of forming arsenate of aluminium by slight heating.

2. A bonding agent for refractories, consisting of a mixture of substances containing a high percentage of aluminium oxide ($Al_2O_3$) with arsenic compounds having the quality of forming arsenate of aluminium by slight heating, said arsenic compounds consisting substantially of arsenic acid ($As_2O_5$).

3. A bonding agent for refractories, consisting of a mixture of substances containing a high percentage of aluminium oxide ($Al_2O_3$) with arsenic compounds having the quality of forming arsenate of aluminium by slight heating, said arsenic compounds consisting substantially of acid-reacting arsenates of alkaline earth metals of the type of mono-calcium-orthoarsenate ($Ca.2(H_2AsO_4)$).

4. A bonding agent for refractories, consisting of a mixture of substances containing a high percentage of aluminium oxide ($Al_2O_3$) with arsenic compounds having the quality of forming arsenate of aluminium by slight heating, said arsenic compounds substantially consisting of ammonium arsenate, preferably diammonium arsenate.

5. A bonding agent for refractories, containing 75 to 95% filling material, 24.5 to 4.5% aluminium hydroxides and 0.5 to 5% arsenic compounds having the quality of forming arsenate of aluminium by slight heating.

6. A bonding agent for refractories, containing 80 to 95% pure crystalline aluminium oxide, 19.5 to 4.5% aluminium hydroxide and 0.5 to 2% arsenic acid.

7. A bonding agent for refractories, containing 75 to 95% filling material, 24.5 to 4.5% aluminium hydroxide and 0.5 to 5% acid-reacting arsenates of alkaline earth metals.

8. A bonding agent for refractories, consisting of a mixture of substances containing a high percentage of aluminium oxide ($Al_2O_3$) and arsenic compounds having the quality of forming arsenate of aluminium by slight heating, said arsenic compounds substantially consisting of ammonium arsenate, preferably diammonium arsenate, in which water soluble aluminium salts, preferably aluminium sulphate, are added to the ammonium arsenate.

JOHAN BERTIL STÅLHANE.